United States Patent
Ueda

(10) Patent No.: US 8,212,898 B2
(45) Date of Patent: Jul. 3, 2012

(54) DRIVING METHOD FOR ZOOM LENS DEVICE, IMAGE PICKUP DEVICE USING THE METHOD, AND MOBILE INFORMATION DEVICE

(75) Inventor: Minoru Ueda, Sagamihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 367 days.

(21) Appl. No.: 12/312,449

(22) PCT Filed: Oct. 16, 2007

(86) PCT No.: PCT/JP2007/070125
§ 371 (c)(1),
(2), (4) Date: Dec. 16, 2009

(87) PCT Pub. No.: WO2008/056512
PCT Pub. Date: May 15, 2008

(65) Prior Publication Data
US 2010/0149382 A1   Jun. 17, 2010

(30) Foreign Application Priority Data
Nov. 10, 2006   (JP) .................... 2006-305347

(51) Int. Cl.
*H04N 5/262* (2006.01)
*G02B 15/16* (2006.01)
(52) U.S. Cl. ............... 348/240.3; 348/240.99; 359/685
(58) Field of Classification Search .............. None
See application file for complete search history.

(56) References Cited

U.S. PATENT DOCUMENTS

| | | | |
|---|---|---|---|
| 5,157,550 A | 10/1992 | Tsuchida et al. | |
| 6,268,964 B1 | 7/2001 | Ozaki et al. | |
| 6,377,404 B1* | 4/2002 | Goosey, Jr. | 359/682 |
| 6,741,399 B2* | 5/2004 | Ori | 359/687 |
| 7,522,349 B2* | 4/2009 | Eguchi | 359/687 |
| 7,706,080 B2* | 4/2010 | Ohtake et al. | 348/240.3 |
| 2003/0081324 A1 | 5/2003 | Takeshita | |
| 2004/0056969 A1* | 3/2004 | Hamano et al. | 348/240.3 |

FOREIGN PATENT DOCUMENTS

| | | |
|---|---|---|
| CN | 1416010 A | 5/2003 |
| JP | 3-158817 | 7/1991 |
| JP | 06-230281 | 8/1994 |
| JP | 10-039214 | 2/1998 |
| JP | 11-149044 | 6/1999 |
| JP | 2000-81571 | 3/2000 |
| JP | 2004-012504 | 1/2004 |

* cited by examiner

*Primary Examiner* — Luong T Nguyen
(74) *Attorney, Agent, or Firm* — George W. Neuner; Edwards Wildman Palmer LLP

(57) ABSTRACT

When focal lengths are discretely set, zoom positions are set, relative to a focal length fr at a position at which a movement direction of a correction group, is reversed, such that a difference value between a focal length which is the closest to the focal length fr and falling between a focal length fw at a wide angle end and the focal length fr, and a next focal length is larger than a difference value between any remaining adjacent focal lengths. By moving from the zoom position of the closest focal length directly to the zoom position of the next focal length, a movement range of the correction group can be made smaller than a movement range in the case where the lens position of the focal length fr is set as the zoom position.

5 Claims, 6 Drawing Sheets

DRIVING METHOD FOR ZOOM LENS DEVICE, IMAGE PICKUP DEVICE USING THE METHOD, AND MOBILE INFORMATION DEVICE

TECHNICAL FIELD

This invention relates to a driving method for a zoom lens device, an image pickup device using the same, and mobile information equipment.

BACKGROUND ART

A zoom lens is a lens for changing a focal length by moving a plurality of movable lens groups making up the zoom lens in an optical axis direction. The movable lens groups making up the zoom lens are largely divided into a zoom group comprising one or a plurality of zoom lenses, which mainly functions to change the focal length, and a correction group comprising one or a plurality of lenses, which functions to correct movement of an image plane during a magnification change. Zoom lenses adopting a driving method by which the zoom group moves in one direction during the magnification change, and the correction group moves in one direction and reverses its movement direction to make a U-turn are widely used because of their simple structure and easiness in aberration correction [e.g., JP10-039214A (Patent Document 1), JP11-149044A (Patent Document 2)].

Recently, these zoom lenses have come to be applied also to small-sized cameras such as compact digital cameras. In lens-integrated cameras such as compact digital cameras, there are demands such as reducing a size, and enabling photographing at a position as close as possible to an object. Therefore, a lens is becoming a mainstream, in which instead of mechanically interlocking a correction lens and a variable magnification lens with a cam, a movement locus of a correction lens is stored in a microcomputer in advance as a data table representing a lens cam locus, and the correction lens is driven according to the data table.

In a small size camera or a camera mounted on a mobile device, because of its small lens system, movement of lenses during a magnification change is generally performed by a driving device such as a motor mounted on the camera. Also in the case where each lens is moved using such a driving device, a method in which each lens is moved according to a lens position data table mounted in advance to obtain a desired focal length is commonly applied. On this occasion, lens position data by which all the focal lengths can be sequentially obtained are not written in the lens position data table due to a limitation of data storage capacity, but lens position data corresponding to 5 to 20 discrete focal lengths only are written.

Incidentally, in a conventional zoom lens in which discrete focal lengths are set, and a movement direction of a correction group is reversed, respective focal lengths (zoom magnifications) are set at regular intervals (namely, like f2−f1=f3−f2= . . . , a difference in focal length between two adjacent focal lengths is equal). Therefore, it becomes highly probable that a zoom position (which is a lens position of a respective lens group corresponding to a discretely set focal length) is set at a lens position at which the correction group reverses its movement direction.

If the zoom position has been set at the lens position at which the movement direction is reversed, the zoom position set to the lens position at which the movement direction is reversed is to limit a movement range of the correction group. Therefore, in optical design, it is necessary to perform designing such that a space is secured to prevent interference between lenses from occurring at the zoom position corresponding to the lens position at which the movement direction of the correction group is reversed. In addition, in design for lens holders or a driving portion, because a full stroke of a driving system is determined at the zoom position corresponding to the lens position at which the movement direction is reversed, it is necessary to perform designing such that interference between the lens holders does not occur at the zoom position corresponding to the lens position.

As described above, because the zoom position set at the lens position at which the correction group reverses the movement direction limits the movement range of the correction group, even if attempting to make the zoom lens compact, the zoom lens cannot easily be made compact.

If the full stroke of the correction group can be shortened without changing the optical design, enough space will be provided by reducing a size of a lens driving portion, thus enabling miniaturization of the whole zoom lens. In addition, shortening the full stroke of the correction group would make it possible to achieve a more compact optical design.

SUMMARY OF INVENTION

Technical Problem

It is an object of the invention to provide a driving method for a zoom lens device that can make a zoom lens compact, an image pickup device using the same, and mobile information equipment using the image pickup device.

Solution to Problem

In order to solve the problem, there is provided, according to an aspect of the present invention, a driving method for a zoom lens device, the zoom lens device comprising a lens system including a zoom group for changing a focal length of the lens system by moving in one optical axis direction during a magnification change, the zoom group including one or more lenses, and a correction group for correcting movement of an image plane by reversing a movement direction thereof during the magnification change, the correction group including one or more lenses, the method driving the zoom lens device in accordance with a table which contains zoom position data indicating respective stoppable positions of the zoom group and the correction group, wherein when a focal length of the lens system at a position at which the movement direction of the correction group is reversed is expressed as fr, and when, with zoom positions of the correction group being numbered in ascending order from a shortest focal length, a zoom position of the correction group is expressed as n, which is a natural number, and a focal length of lens system at the zoom position n of the correction group is expressed as fn and a focal length of the lens system at a zoom position (n+1) adjacent to the zoom position n of the correction group (G2) is expressed as f(n+1), for a focal length fn and a focal length f(n+1) that satisfy a relationship of fn<fr<f(n+1), the zoom position n and the zoom position (n+1) are set such that a difference value (f(n+1)−fn) between the focal length f(n+1) and the focal length fn is larger than a difference value (f(m+1)−fm) between a focal length fm and a focal length f(m+1) of the lens system at any adjacent zoom positions m and (m+1) of the correction group other than the zoom positions n and (n+1), where m is a natural number that satisfies m≠n.

With the above construction, in the correction group, the difference value between the focal length f(n) at the zoom position n, which is adjacent to the position at which the movement direction is reversed, and the focal length f(n+1) at the next zoom position (n+1) is set larger than the difference value between the focal length fm and the focal length f(m+1) at any other adjacent zoom positions m and (m+1) of the correction group. Therefore, the probability that the zoom position (n) or the zoom position (n+1) is set to the position at which the correction group reverses the movement direction is extremely low.

In the case where neither the zoom position n nor the zoom position (n+1) is set at the position at which the correction group reverses the movement direction, during the magnification change, the correction group moves to the zoom position n, which gives a focal length closest to fr of all focal lengths between the focal length fw at the wide angle end and the focal length fr. And then, the correction group moves to the zoom position (n+1) without passing the position at which the focal length fr is given. Therefore, the movement range of the correction group can be shortened by the distance from the zoom position n or (n+1) to the position at which the focal length fr is given, compared with the case where the correction group passes the position at which the focal length fr is given.

Accordingly, it is possible to reduce the size of the lens driving portion by the reduction of the movement range of the correction group. Furthermore, since the movement range of the correction group is reduced, it is possible to bring the lens group adjacent to the correction group closer to the correction group accordingly, so that the total length of the zoom lens can be shortened.

In one embodiment, with a focal length of the lens system at a wide angle end being expressed as fw, the zoom position n and the zoom position (n+1) are set so as to satisfy the following formulas:

$$fr - fn \geq fw/100$$

$$f(n+1) - fr \geq fw/100.$$

According to the embodiment, the zoom position n and the zoom position (n+1) are allowed to be sufficiently kept away from the position at which the focal length fr is given. Therefore, the movement range of the correction group can be reduced more.

In one embodiment, the zoom position n and the zoom position (n+1) are set so as to satisfy the following formula:

$$\{fn + f(n+1)\}/2 = fr.$$

According to the embodiment, the zoom position n and the zoom position (n+1) can be made roughly identical. Therefore, when zooming the focal length from fn to f(n+1) or from f(n+1) to fn, it is not necessary to move the correction group, so that power consumption can be made lower.

There is also provided, according to another aspect of the present invention, an image pickup device comprising:

a zoom lens device comprising a lens system including a zoom group for changing a focal length of the lens system by moving in one optical axis direction during a magnification change, the zoom group including one or more lenses, and a correction group for correcting movement of an image plane by reversing a movement direction thereof during the magnification change, the correction group including one or more lenses; and a table containing zoom position data indicating stoppable positions of the zoom group and the correction group, wherein when a focal length of the lens system at a position at which the movement direction of the correction group is reversed is expressed as fr, and when, with zoom positions of the correction group being numbered in ascending order from a shortest focal length, a zoom position of the correction group is expressed as n, which is a natural number, and a focal length of the lens system at the zoom position n of the correction group is expressed as fn and a focal length of the lens system at a zoom position (n+1) adjacent to the zoom position n of the correction group is expressed as f(n+1), for a focal length fn and a focal length f(n+1) that satisfy a relationship of fn<fr<f(n+1), the zoom position n and the zoom position (n+1) are set such that a difference value (f(n+1)−fn) between the focal length f(n+1) and the focal length fn is larger than a difference value (f(m+1)−fm) between a focal length fm and a focal length f(m+1) of the lens system at any adjacent zoom positions m and (m+1) of the correction group other than the zoom positions n and (n+1), where m is a natural number that satisfies m≠n.

With the above construction, which employs the above driving method for a zoom lens device is employed, the size of a lens driving portion is allowed to be reduced so that the total length of the zoom lens can be shortened. Thus, it becomes possible to make the image pickup device compact.

There is also provided, according to another aspect of the present invention, mobile information equipment including the above-mentioned image pickup device.

With the above construction, since the image pickup device that can be compactly formed is included, it becomes possible to attempt the reduction in the size of the mobile information equipment as well as to photograph at a position closer to an object.

Advantageous Effects of Invention

As is apparent from the above description, in the driving method for a zoom lens device of the invention, with the focal length at the position at which the movement direction of the correction group is reversed being expressed as fr, and with the focal lengths of the lens system at the adjacent zoom positions n and (n+1) being expressed as fn and f(n+1), with respect to the focal length fn and the focal length f(n+1) that satisfy the relationship of fn<fr<f(n+1), the zoom position n and the zoom position (n+1) are set such that the difference value between the focal length f(n+1) and the focal length fn is larger than a difference value between focal lengths at any two zoom positions other than the zoom position n and the zoom position (n+1). Therefore, the probability that the position at which the correction group reverses the movement direction is set as the zoom position n and the zoom position (n+1) is extremely low.

In the case where neither the zoom position n nor the zoom position (n+1) is set at the position at which the correction group reverses the movement direction, the correction group can move directly to the zoom position (n+1) after moving to the zoom position n during the magnification change from the wide angle end to the telephoto end. Therefore, the movement range of the correction group can be reduced by the distance from the zoom position n or (n+1) to the position at which the focal length fr is given, compared with the case where the correction group passes the position at which the focal length fr is given.

That is, according to the invention, it is possible to reduce the size of the lens driving portion by the reduction of the movement range of the correction group. Furthermore, since the movement range of the correction group is reduced, it is possible to place the lens group adjacent to the correction group closer to the correction group, so that the total length of the zoom lens can be shortened.

Since the image pickup device of the invention has a construction that can reduce the size of the lens driving portion and shorten the total length of the zoom lens as in the case of the driving method for a zoom lens device, it becomes possible to make the image pickup device compact.

Since the mobile information equipment includes the image pickup device which can be compactly formed, it becomes possible to attempt the reduction in the size of the mobile information equipment and achieve ability to photograph at the position close to the object.

DESCRIPTION OF EMBODIMENTS

The invention will hereinafter be described by embodiments illustrated. It should not be construed that the invention is limited to the following embodiments.

Figure 1:
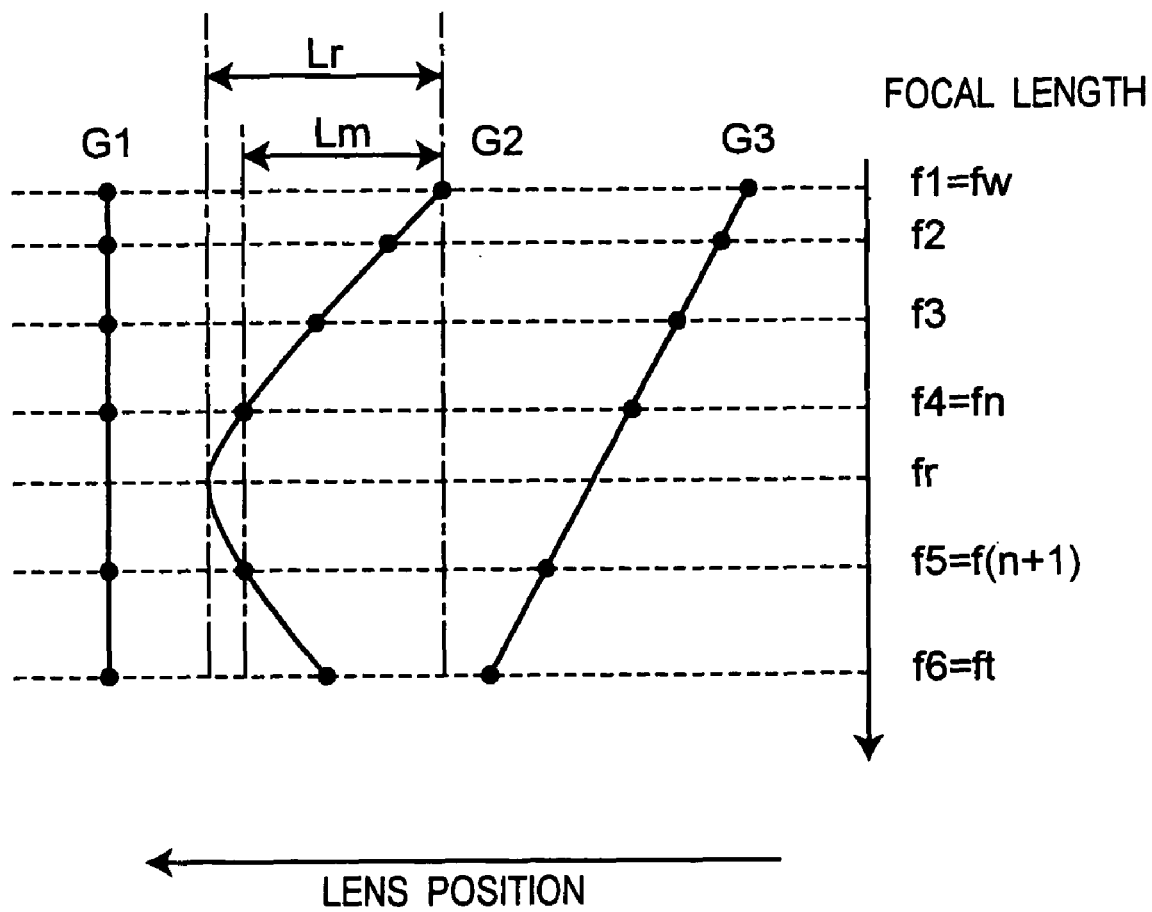
FIG. 1 is a graph showing positions of respective lens groups with respect to changes in focal lengths in a zoom lens constructed of a zoom group for changing a focal length during a magnification change and a correction group reversing its movement direction to correct movement of an image plane during the magnification change.
Figure 2:
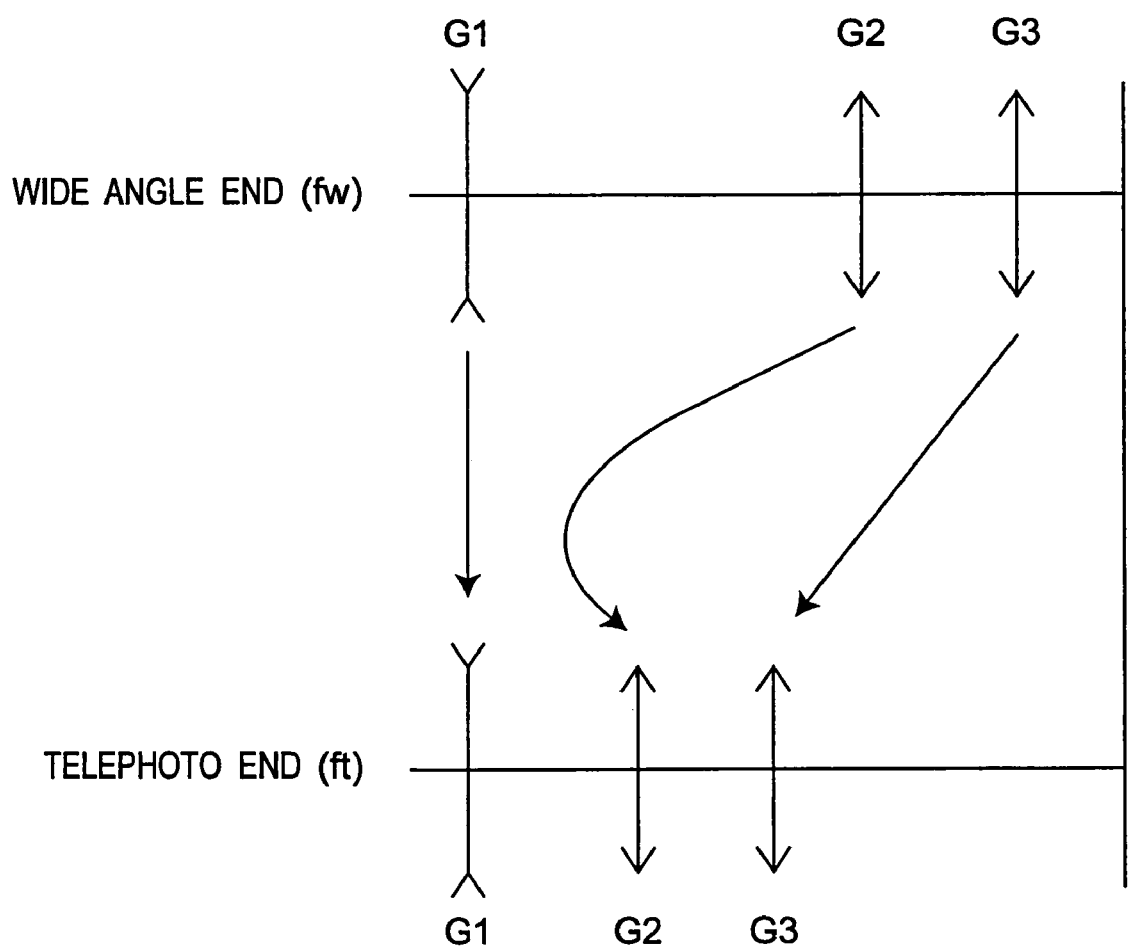
FIG. 2 is a conceptual diagram of a zoom lens constructed of a zoom group for changing a focal length during a magnification change and a correction group reversing its movement direction to correct movement of an image plane during the magnification change.

FIG. 1 shows positions of respective lens groups G1, G2, G3 with respect to changes in focal length in a zoom lens device (hereinafter simply referred to as a zoom lens) constructed of a zoom group for changing a focal length of a lens system by moving in one optical axis direction during a magnification change, and a correction group for correcting movement of an image plane by reversing its movement direction during the magnification change. FIG. 2 is a conceptual diagram of a zoom lens constructed of a zoom group for changing a focal length of a lens system by moving in one optical axis direction during a magnification change, and a correction group for correcting movement of an image plane by reversing its movement direction during the magnification change.

First, prior to describing a driving method for a zoom lens device of the invention, a zoom lens having a correction group moving in one direction and then reversing its movement direction will be described.

As shown in FIG. 2, an example of the zoom lens constructed of the zoom group for changing the focal length of the lens system by moving in one optical axis direction during the magnification change and the correction group for correcting movement of the image plane by reversing the movement direction during the magnification change, is constructed of a first lens group G1, a second lens group G2, and a third lens group G3, the group lenses being arranged in this order from the object side.

The first lens group G1 has a negative refractive power, and its position (hereinafter referred to also as "lens position" as well) is fixed during the magnification change. The second lens group G2 has a positive refractive power, and serves as the correction group for correcting movement of the image plane by moving toward the object side and then moving toward the image plane side by reversing the movement direction during the magnification change from a wide angle end to a telephoto end. The third lens group G3 has a positive refractive power, and serves as the zoom group for changing the focal length of the lens system by moving from the image plane side toward the object side during the magnification change from the wide angle end to the telephoto end.

Next, the driving method for a zoom lens device of the invention will be described.

In FIG. 1, solid lines show positions of the respective lens groups G1, G2, G3, demonstrating how the second lens group G2 that is the correction group and the third lens group G3 that is the zoom group move according to changes in focal length. "Lr" indicates a movement range of the second lens group (correction group) G2 in the case where a zoom position is set such that it satisfies a focal length fr at a position at which the movement direction of the second lens group (correction group) G2 is reversed. On the other hand, "Lm" indicates a movement range of the second lens group (correction group) G2 in the present embodiment.

In the present embodiment, regarding a focal length fr at which the movement direction of the second lens group (correction group) G2 is reversed in the case where discrete focal lengths are set as described above, if zoom positions of the second lens group (correction group) G2 are numbered in ascending order from a shortest focal length to give a zoom position n (n is a natural number) and a focal length fn at a zoom position n and a focal length f(n+1) at an adjacent zoom position (n+1) satisfy the following relationship: fn<fr<f(n+1), the zoom position n and the zoom position (n+1) are set such that the difference value between the focal length f(n+1) and the focal length fn is larger than a maximum difference value between the other adjacent focal lengths, the maximum value being different from the above difference value.

Therefore, in the case of an example shown in FIG. 1, the respective zoom positions are set such that a relationship between a focal length f4 at a fourth zoom position (at which a focal length closest to the focal length fr is given between a focal length fw(=f1) and the focal length fr), a focal length f5 at a position subsequent thereto, and focal lengths f1, f2, f3, f6 at the other zoom positions satisfy the following relationship: f5−f4>a maximum value of (f2−f1), (f3−f2), (f4−f3) or (f6−f5). When the respective zoom positions are set in this manner, since the second lens group G2 that is the correction group directly moves to the lens position at which the focal length f5 is given from the lens position at which the focal length f4 is given not via the lens position at which the focal length fr is given, the second lens group G2 does not need to move to the lens position at which the focal length fr is given. For that reason, the movement range Lm of the second lens group G2 that is the correction group in the present embodiment can be made smaller than the movement range Lr in the case where the lens position at which the focal length fr is given is set as the zoom position.

As described above, as the movement range of the lens group becomes smaller, a stroke of a lens driving device can be made shorter, so that a camera can be made more compact. In addition, the distance of closest approach between the first lens group G1 that is the fixed lens group and the movable second lens group G2 becomes longer, a design in which the first lens group G1 is placed closer to the second lens group G2 becomes feasible, so that it becomes possible to design a zoom lens having a shorter total length.

In general, the focal lengths are set at equal intervals such as one time, one-and-a-half times, two times, . . . . In the case where the focal lengths are set at equal intervals, and also when a zoom position n' and a zoom position (n+1)' are set so that the relationship of fn'<fr<f(n+1)' is satisfied, the second lens group G2 that is the correction group directly moves to the zoom position (n+1)' at which a focal length (n+1)' is given from the lens position at which a focal length fn' is given not via the lens position at which the focal length fr is given, a movement range Lm' of the second lens group G2 can be made smaller than the movement range Lr. However, in the present embodiment, the relationship of:

$$f(n+1)-fn > f(n+1)'-fn' = f2-f1 = \ldots = fn'-f(n-1) = f(n+2)-f(n+1)' = \ldots$$

holds. Thus, if the zoom position n and the zoom position (n+1) are set such that the relationship of fn<fn'<fr<f(n+1)'<f(n+1) is satisfied, as seen from FIG. 1, the distance from the lens position at which the focal length fr is given to the lens position at which the focal length fn or f(n+1) is given becomes larger than the distance from the lens position at which the focal length fr is given to the lens position at which the focal length fn' or f(n+1)' is given. Accordingly, the movement range Lm of the second lens group G2 (correction group) can be made smaller than the movement range Lm'.

In doing so, it is preferred that the zoom position n and the zoom position (n+1) be set within a range represented by the following formulas:

$$fr-fn \geqq fw/100$$

$$f(n+1)-fr \geqq fw/100.$$

By this arrangement, the lens positions of the correction group, at which the focal length fn and the focal length f(n+1) are obtained, can be sufficiently kept away from the lens position of the correction group, at which the focal length fr is obtained, and an effect of reducing the movement range Lm of the correction group (see FIG. 1) can be improved.

In addition, the above ranges of the zoom position n and the zoom position (n+1) were found by actual measurement. By setting the zoom position n and the zoom position (n+1) within the above ranges, the movement range Lm of the correction group can be made smaller by 2 μm to 5 μm as compared with the conventional case.

Furthermore, it is preferred that the zoom position n and the zoom position (n+1) be set so that the relationship represented by the following formula:

$$\{fn+f(n+1)\}/2=fr$$

holds. By this arrangement, the lens position of the correction group at which the focal length fn is given and the lens position of the correction group at which the focal length f(n+1) is given can be made roughly identical. Therefore, when zooming from the focal length fn to the focal length f(n+1), or from the focal length f(n+1) to the focal length fn, it is not required to move the correction group, so that the power consumption is suppressed.

First Embodiment

Figure 3:
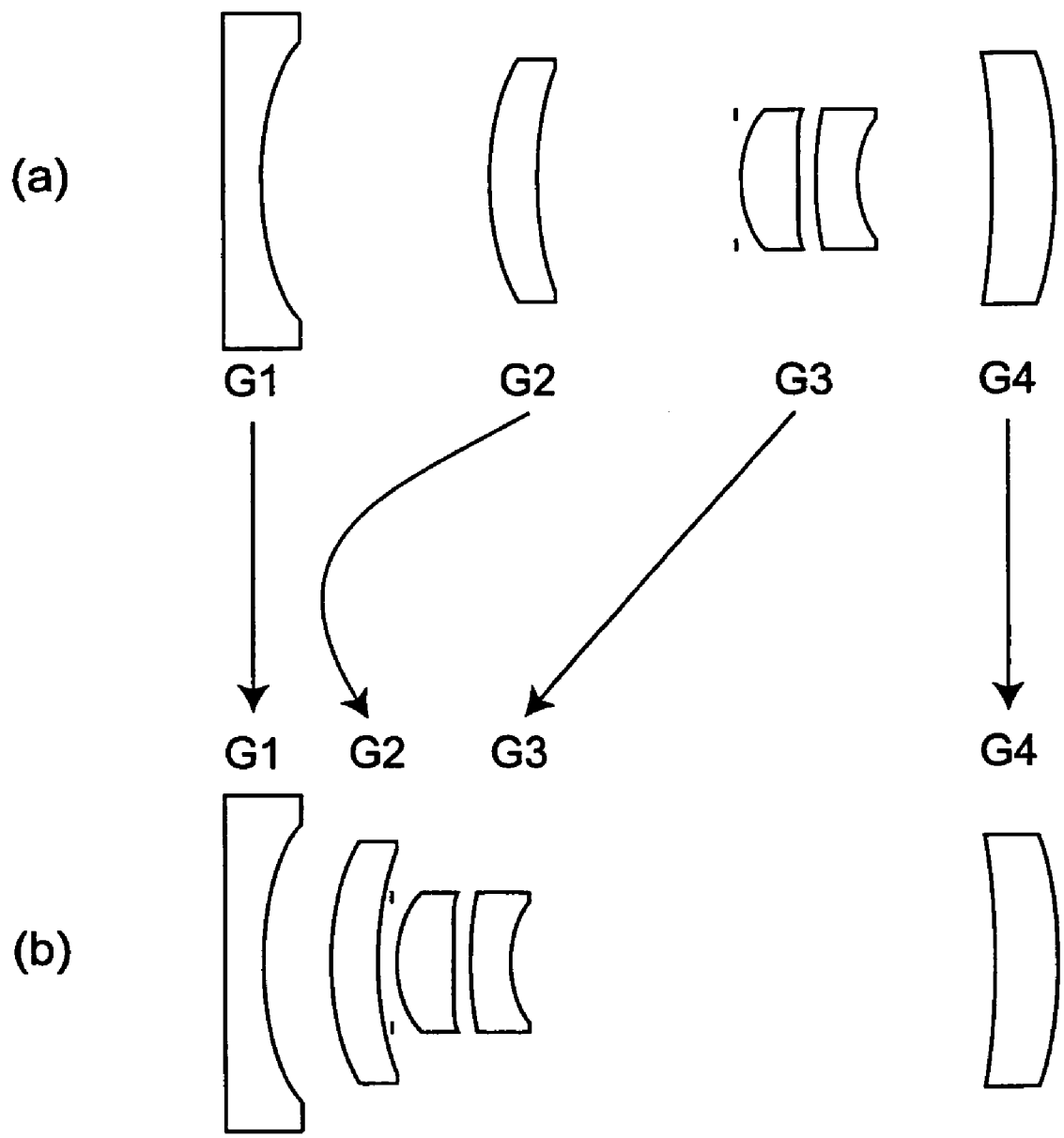
FIG. 3 is a cross sectional view of a zoom lens to which a driving method for a zoom lens of the invention is applied.

FIG. 3 is a cross sectional view showing the construction in a zoom lens to which a driving method for a zoom lens device of the present embodiment is applied. However, the upper row of FIG. 3 shows lens positions at a wide angle end, and the lower row of FIG. 3 shows lens positions at a telephoto end. Further, the left side of FIG. 3 is the object side, and the right side of FIG. 3 is the image plane side. Arrows in the figure show a state of lens movement during zooming.

The zoom lens shown in FIG. 3 is constructed of a first lens group G1, a second lens group G2, a third lens group G4 and a fourth lens group G4 which are aligned in this order from the object side.

The first lens group G1 has a negative refractive power, and its lens position is fixed during a magnification change. The second lens group G2 has a positive refractive power, and during the magnification change from the wide angle end to the telephoto end, it moves toward the object side, then reverses its movement direction and moves toward the image plane side, thereby functioning as a correction group for correcting movement of the image plane during the magnification change. The third lens group G3 has a positive refractive power, and during the magnification change from the wide angle end to the telephoto end, it moves toward the object side from the image plane side, thereby functioning as a zoom group for changing a focal length of a lens system.

The fourth lens group G4 has a positive refractive power, and its position is fixed during the magnification change.

Figure 4:
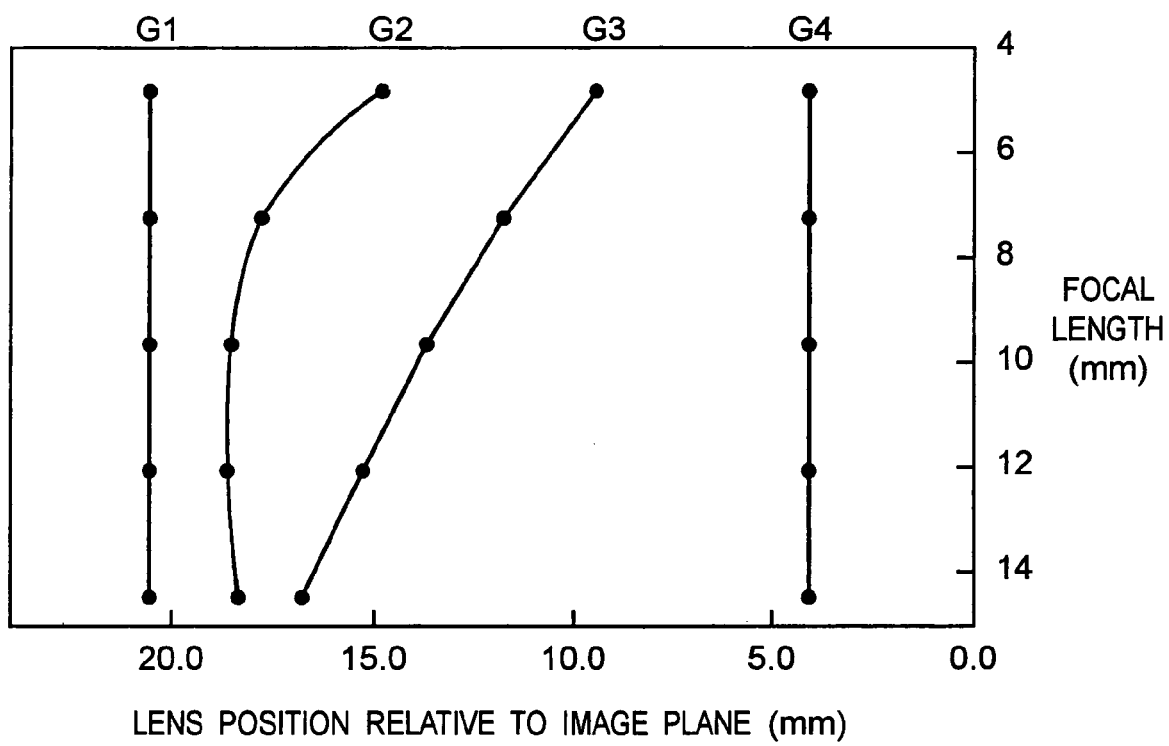
FIG. 4 is a drawing showing a relationship between positions of respective lens groups relative to an image plane and focal lengths in the zoom lens shown in FIG. 3.

FIG. 4 shows a relationship between a position of each of the lens groups G1-G4 in the zoom lens shown in FIG. 3 relative to the image plane and a focal length thereof. During the magnification change, the lens groups G1-G4 move on the optical axis along solid lines of FIG. 4 and stop at desired lens positions (zoom positions) represented by black circles in order to obtain desired focal lengths. During this magnification change from the wide angle end to the telephoto end, the second lens group G2 as the correction group reverses its movement direction and moves toward the image plane side after moving toward the object side. The focal length at which the movement direction is reversed is fL=10.8 mm.

Table 1 shows lens position data in the present embodiment. In FIG. 1, lens position data of the focal length fL at which the movement direction of the second lens group G2 is reversed is also added. In the present embodiment, of the lens positions, zoom positions are set at lens positions at which focal lengths f1-f5 are given excluding the focal length fL.

TABLE 1

|  | Focal length | Magnification ratio | Position of G2 | Position of G3 |
| --- | --- | --- | --- | --- |
| f1 (=fw) | 4.8 | 1.0 | 14.9 | 9.5 |
| f2 | 7.2 | 1.5 | 17.7 | 11.8 |
| f3 | 9.6 | 2.0 | 18.5 | 13.7 |
| fL | 10.8 | 2.3 | 18.6 | 14.5 |
| f4 | 12.4 | 2.6 | 18.5 | 15.6 |
| f5 (=ft) | 14.4 | 3.0 | 18.3 | 16.8 | unit: mm

As seen from Table 1, in the case where the lens position at which the focal length fL is given is set as the zoom position, the second lens group G2 that is the correction group moves from 14.9 mm to 18.6 mm in terms of the position relative to the image plane. Contrary to that, according to the driving method for a zoom lens device of the present embodiment, since the lens position at which the focal length fL is given is not set as the zoom position, the second lens group G2 only moves from 14.9 mm to 18.5 mm in terms of the position relative to the image plane. Thus, the driving range of the second lens group G2 can be shortened by 0.1 mm. Therefore, a driving portion of the second lens group G2 can be made smaller, enabling a reduction in size of a zoom lens module. In addition, since the distance of closest approach between the first lens group G1 and the second lens group G2 is increased by 0.1 mm, this enables an optical design which brings the first lens group G1 closer to the image plane side by that amount, so that the total length of the lens can be shortened.

As described above, according to the driving method for a zoom lens device of the present embodiment, the zoom lens module including the driving portion can be made compact, and it is possible to realize a small sized and thin zoom lens preferred for portable equipment such as, for example, a mobile phone and PDA (Personal Digital Assistants).

Next, examples of numerical values of the zoom lens in the present embodiment are shown in Table 2 through Table 4. Table 2 shows surface data. The surface data of lens surfaces, which are listed in order from the object side, include the radius of curvature [mm] of each lens surface, axial intersurface spacing (lens thickness or air spacing) [mm], refractive index to d line, and Abbe number to d line.

TABLE 2

| Surface | | Radius of curvature | Axial intersurface spacing | Refractive index | Abbe number |
|---|---|---|---|---|---|
| 1 | | 85.181 | 0.800 | 1.806 | 40.7 |
| 2 | Aspheric surface | 5.377 | Variable | | |
| 3 | Aspheric surface | 5.856 | 1.136 | 1.821 | 24.1 |
| 4 | Aspheric surface | 9.185 | Variable | | |
| 5 | Diaphragm | ∞ | 0.100 | | |
| 6 | Aspheric surface | 2.577 | 1.265 | 1.589 | 61.3 |
| 7 | Aspheric surface | −13.859 | 0.307 | | |
| 8 | | 10.811 | 0.900 | 1.847 | 23.8 |
| 9 | | 2.706 | Variable | | |
| 10 | Aspheric surface | 177.531 | 1.345 | 1.821 | 24.1 |
| 11 | Aspheric surface | −21.120 | 1.806 | | |

The aspheric surfaces in Table 2 have aspheric surface shapes expressed by the following aspheric surface equation (1):

$$Z = \frac{\frac{Y^2}{R}}{1 + \sqrt{1 - (1+K)\frac{Y^2}{R^2}}} + AY^4 + BY^6 + CY^8 + DY^{10} \quad (1)$$

In the above equation, K is a conic constant, A, B, C and D are aspheric surface coefficients, Y is a height from the optical axis, R is a radius of curvature at an aspheric surface vertex, Z is a distance in a direction perpendicular to the tangential plane of the aspheric surface vertex on the aspheric surface at the height Y from the optical axis.

TABLE 3

| Surface | R | K | A | B | C | D |
|---|---|---|---|---|---|---|
| 2 | 5.377 | −0.5478 | −1.3626E−04 | 6.6750E−05 | −7.2294E−06 | 2.5478E−07 |
| 3 | 5.856 | −0.4176 | −5.8212E−04 | −1.4762E−04 | 3.2005E−05 | −1.4571E−07 |
| 4 | 9.185 | −0.7003 | −6.2275E−04 | 2.0603E−04 | 6.6839E−05 | −1.1119E−06 |
| 6 | 2.577 | −0.4622 | 4.1894E−03 | 2.5944E−04 | −2.6155E−04 | 3.8769E−04 |
| 7 | −13.859 | −0.3843 | 1.3565E−02 | 5.9339E−03 | −2.5111E−03 | 1.7132E−03 |
| 10 | 177.531 | −1.0000 | −9.5264E−03 | 5.0957E−04 | 3.8019E−05 | −3.3353E−06 |
| 11 | −21.120 | 0.6999 | −8.7471E−03 | 1.6765E−04 | 5.7223E−05 | −3.0914E−06 |

Aspheric surface data R, K, A, B, C, and D in the equation (1) are shown in Table 3. It is noted that in Table 3 an index base 10 is represented by a symbol E and a multiplication sign * is omitted according to the expression in the floating point format of Table 3. For example, $-0.12345*10^{-15}$ is expressed as −0.12345E−15.

Zoom data of the individual lenses are shown in Table 4. In Table 4, "intersurface spacing 2" means a distance [mm] between the second surface and the third surface (namely, between the first lens group G1 and the second lens group G2), "intersurface spacing 4" means a distance [mm] between the fourth surface and the fifth surface (namely, between the second lens group G2 and the diaphragm), and "intersurface spacing 9" means a distance [mm] between the ninth surface and the tenth surface (namely, between the third lens group G3 and the fourth lens group G4).

TABLE 4

| | Wide angle end | Telephoto end |
|---|---|---|
| Focal length | 4.8 | 14.4 |
| Intersurface spacing 2 | 4.832 | 1.357 |
| Intersurface spacing 4 | 4.190 | 0.452 |
| Intersurface spacing 9 | 2.819 | 10.031 |

Second Embodiment

Figure 5:
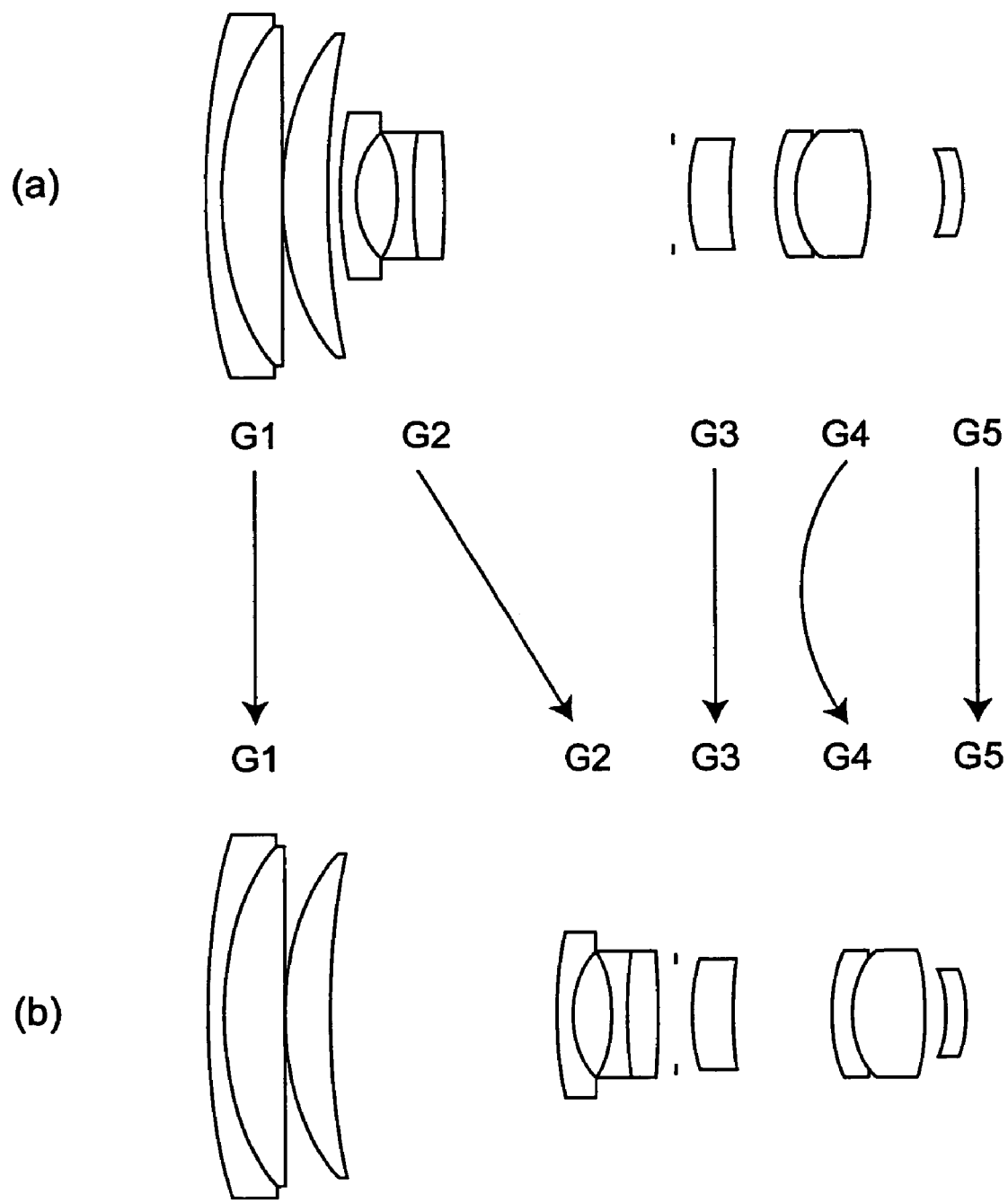
FIG. 5 is a cross sectional view of a zoom lens different from FIG. 3.

FIG. 5 is a cross sectional view showing the construction of a zoom lens to which a driving method for a zoom lens device of the present embodiment is applied. The upper row of FIG. 5 shows lens positions at a wide angle end, and the lower row of FIG. 5 shows lens positions at a telephoto end. Further, the left side of FIG. 5 is the object side, and the right side of FIG. 5 is the image plane side. Arrows in the figure show a state of lens movement during zooming.

The zoom lens shown in FIG. 5 is constructed of a first lens group G1, a second lens group G2, a third lens group G3, a fourth lens group G4 and a fifth lens group G5, which are arranged in this order from the object side.

The first lens group G1 has a positive refractive power, and its position is fixed during a magnification change. The second lens group G2 has a negative refractive power, and during the magnification change from the wide angle end to the telephoto end, it moves toward the image plane side from the object side, thereby functioning as a zoom group for changing a focal length of a lens system. The third lens group G3 has a positive refractive power, and its position is fixed during the magnification change. The fourth lens group G4 has a positive refractive power, and during the magnification change from the wide angle end to the telephoto end, it moves toward the object side, reverses its movement direction and moves toward the image plane side, thereby functioning as a correction group for correcting movement of the image plane during the magnification change. The fifth lens group G5 has a positive refractive power, and its position is fixed during the magnification change.

Figure 6:
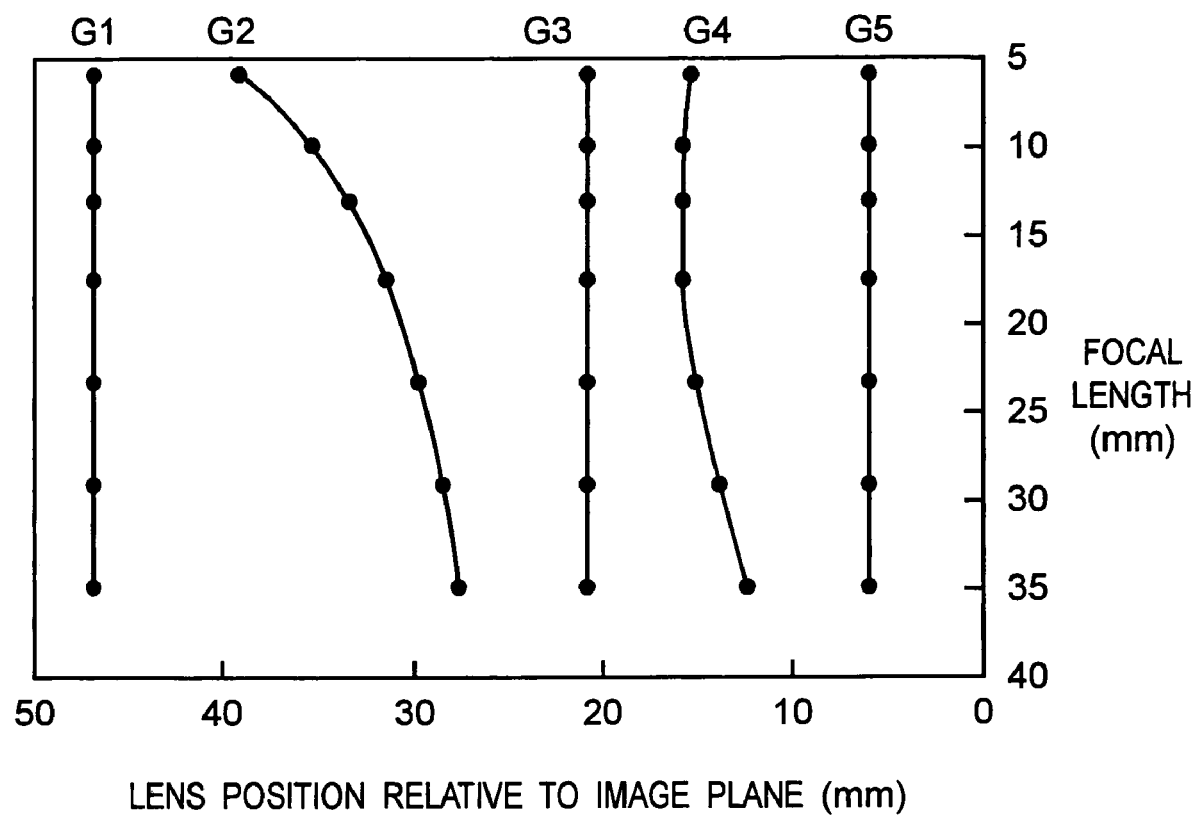
FIG. 6 is a drawing showing a relationship between positions of respective lens groups relative to an image plane and focal lengths in the zoom lens shown in FIG. 5.

FIG. 6 shows a relationship between a position of each of the lens groups G1-G5 in the zoom lens shown in FIG. 5 relative to the image plane and a focal length thereof. During the magnification change, the lens groups G1-G5 move on an optical axis along solid lines of FIG. 6 and stop at desired lens positions (zoom positions) represented by black circles in order to obtain desired focal lengths. During this magnification change from the wide angle end to the telephoto end, the fourth lens group G4 as the correction group reverses its movement direction and moves toward the image plane side after moving toward the object side. The focal length at which the movement direction is reversed is fL=13.2 mm.

Table 5 shows lens position data in the present embodiment. In Table 5, lens position data at the focal length fL at which the movement direction of the fourth lens group G4 is reversed is also added. In the present embodiment, of the lens positions, zoom positions are set at lens positions at which focal lengths f1-f6 are given excluding the focal length fL.

TABLE 5

|  | Focal length | Magnification ratio | Position of G2 | Position of G4 |
|---|---|---|---|---|
| f1 (=fw) | 6.0 | 1.0 | 39.4 | 15.3 |
| f2 | 10.0 | 1.7 | 35.3 | 15.8 |
| fL | 13.2 | 2.2 | 33.4 | 15.9 |
| f3 | 17.5 | 2.9 | 31.6 | 15.8 |
| f4 | 23.3 | 3.9 | 29.9 | 15.1 |
| f5 | 29.0 | 4.8 | 28.7 | 14.0 |
| f6 (=ft) | 34.8 | 5.8 | 27.8 | 12.5 | unit: mm

As seen from Table 5, in the case where the lens position at which the focal length fL is given is set as the zoom position, the fourth lens group G4 that is the correction group moves from 12.5 mm to 15.9 mm in terms of the position relative to the image plane. Contrary to that, according to the driving method for a zoom lens device of the present embodiment, since the lens position at which the focal length fL is given is not set as the zoom position, the fourth lens group G4 only moves from 12.5 mm to 15.8 mm in terms of the position relative to the image plane. Thus, the driving range of the fourth lens group G4 can be shortened by 0.1 mm. Therefore, a driving portion of the fourth lens group G4 can be made smaller, enabling a reduction in size of a zoom lens module. In addition, since the distance of closest approach between the third lens group G3 and the fourth lens group G4 is increased by 0.1 mm, this enables an optical design which brings the third lens group G3 closer to the image plane side by that amount, so that the total length of the lens can be shortened.

As described above, according to the driving method for a zoom lens device of the present embodiment, the zoom lens module including the driving portion can be shortened, and it is possible to realize a small sized and thin zoom lens preferred for mobile equipment such as a mobile phone and a PDA.

Next, examples of numerical values of the zoom lens in the present embodiment are shown in Table 6 through Table 8. Table 6 shows surface data. The surface data of lens surfaces, which are listed in order from the object side, include the radius of curvature [mm] of each lens surface, axial intersurface spacing (lens thickness or air spacing) [mm], refractive index to d line, and Abbe number to d line.

TABLE 6

| Surface |  | Radius of curvature | Axial intersurface spacing | Refractive index | Abbe number |
|---|---|---|---|---|---|
| 1 |  | 35.805 | 1.024 | 1.847 | 23.8 |
| 2 |  | 18.205 | 3.278 | 1.697 | 56.5 |
| 3 |  | 310.629 | 0.102 |  |  |
| 4 |  | 15.877 | 2.356 | 1.697 | 56.5 |
| 5 |  | 44.835 | Variable |  |  |
| 6 |  | 18.086 | 0.922 | 1.773 | 49.8 |
| 7 |  | 5.747 | 2.151 |  |  |
| 8 |  | −8.786 | 0.922 | 1.773 | 49.8 |
| 9 |  | 19.928 | 1.742 | 1.847 | 23.8 |
| 10 |  | −33.548 | Variable |  |  |
| 11 | Diaphragm | ∞ | 1.024 |  |  |
| 12 |  | 9.493 | 2.254 | 1.623 | 56.9 |
| 13 | Aspheric surface | 32.689 | Variable |  |  |
| 14 |  | 10.403 | 0.922 | 1.847 | 23.8 |
| 15 |  | 5.421 | 4.098 | 1.623 | 56.9 |
| 16 | Aspheric surface | −13.543 | Variable |  |  |
| 17 |  | −5.522 | 1.024 | 1.878 | 38.1 |
| 18 |  | −5.888 | 5.107 |  |  |

The aspheric surfaces in Table 6 have aspheric surface shapes expressed by the above aspheric surface equation (1).

Next, aspheric surface data R, K, A, B, C, D in the equation (1) of the second embodiment are shown in Table 7. It is noted that in Table 3 an index base 10 is represented by a symbol E and a multiplication sign * is omitted according to the expression in the floating point format of Table 3. For example, $-0.12345*10^{-15}$ is expressed as −0.12345E-15.

TABLE 7

| Surface | R | K | A | B | C | D |
|---|---|---|---|---|---|---|
| 13 | 32.689 | 1.0000 | 1.7233E−04 | 9.2891E−07 | 1.7204E−08 | −5.0580E−10 |
| 16 | −13.543 | 1.0000 | 3.5979E−04 | 9.7801E−06 | −1.0941E−06 | −1.2485E−08 |

Zoom data of the individual lenses are shown in Table 8. In Table 8, "intersurface spacing 5" means a distance [mm] between the fifth surface and the sixth surface (namely, between the first lens group G1 and the second lens group G2), "intersurface spacing 10" means a distance [mm] between the tenth surface and the eleventh surface (namely, between the second lens group G2 and the diaphragm), "intersurface spacing 13" means a distance [mm] between the thirteenth surface and the fourteenth surface (namely, between the third lens group G3 and the fourth lens group G4), and "interface spacing 16" means a distance [mm] between the sixteenth surface and the seventeenth surface (namely, between the fourth lens group G4 and the fifth lens group G5).

TABLE 8

|  | Wide angle end | Telephoto end |
|---|---|---|
| Focal length | 6.0 | 34.8 |
| Intersurface spacing 5 | 0.615 | 12.290 |
| Intersurface spacing 10 | 12.620 | 0.945 |

TABLE 8-continued

|  | Wide angle end | Telephoto end |
|---|---|---|
| Intersurface spacing 13 | 2.527 | 5.289 |
| Intersurface spacing 16 | 4.136 | 1.370 |

Although the specific numerical values are shown in Table 1 through Table 8 in the first and second embodiments, the driving method for a zoom lens device of the present invention is not limited to the above embodiments. What is important is that, the focal length f(n) at the zoom position n and the focal length f(n+1) at the next zoom position (n+1) should appropriately be set, relative to the focal length fL at the lens position at which the movement direction of the correction group is reversed, such that the relationship of fn<fL<f(n+1) holds, where the zoom position n is a zoom position which provides a focal length that falls between the focal length fL and the focal length fw at the wide angle end and that is the closest to the focal length fL.

The invention claimed is:

1. A driving method for a zoom lens device, the zoom lens device comprising a lens system including a zoom group for changing a focal length of the lens system by moving in one optical axis direction during a magnification change, the zoom group including one or more lenses, and a correction group for correcting movement of an image plane by reversing a movement direction thereof during the magnification change, the correction group including one or more lenses, the method driving the zoom lens device in accordance with a table which contains zoom position data indicating respective stoppable positions of the zoom group and the correction group, wherein when a focal length of the lens system at a position at which the movement direction of the correction group is reversed is expressed as fr, and when, with zoom positions of the correction group being numbered in ascending order from a shortest focal length, a zoom position of the correction group is expressed as n, which is a natural number, and a focal length of the lens system at the zoom position n of the correction group is expressed as fn and a focal length of the lens system at a zoom position (n+1) adjacent to the zoom position n of the correction group is expressed as f(n+1), for a focal length fn and a focal length f(n+1) that satisfy a relationship of fn<fr<f(n+1), the zoom position n and the zoom position (n+1) are set such that a difference value (f(n+1)−fn) between the focal length f(n+1) and the focal length fn is larger than a difference value (f(m+1)−fm) between a focal length fm and a focal length f(m+1) of the lens system at any adjacent zoom positions m and (m+1) of the correction group other than the zoom positions n and (n+1), where m is a natural number that satisfies m≠n.

2. The driving method for a zoom lens device according to claim 1, wherein with a focal length of the lens system at a wide angle end being expressed as fw, the zoom position n and the zoom position (n+1) are set so as to satisfy the following formulas:

$$fr - fn \geq fw/100$$

$$f(n+1) - fr \geq fw/100.$$

3. The driving method for a zoom lens device according to claim 1, wherein the zoom position n and the zoom position (n+1) are set so as to satisfy the following formula:

$$\{fn + f(n+1)\}/2 = fr.$$

4. An image pickup device comprising:

a zoom lens device comprising a lens system including a zoom group for changing a focal length of the lens system by moving in one optical axis direction during a magnification change, the zoom group including one or more lenses, and a correction group for correcting movement of an image plane by reversing a movement direction thereof during the magnification change, the correction group including one or more lenses; and a table containing zoom position data indicating stoppable positions of the zoom group and the correction group, wherein when a focal length of the lens system at a position at which the movement direction of the correction group is reversed is expressed as fr, and when, with zoom positions of the correction group being numbered in ascending order from a shortest focal length, a zoom position of the correction group is expressed as n, which is a natural number, and a focal length of the lens system at the zoom position n of the correction group is expressed as fn and a focal length of the lens system at a zoom position (n+1) adjacent to the zoom position n of the correction group is expressed as f(n+1), for a focal length fn and a focal length f(n+1) that satisfy a relationship of fn<fr<f(n+1), the zoom position n and the zoom position (n+1) are set such that a difference value (f(n+1)−fn) between the focal length f(n+1) and the focal length fn is larger than a difference value (f(m+1)−fm) between a focal length fm and a focal length f(m+1) of the lens system at any adjacent zoom positions m and (m+1) of the correction group other than the zoom positions n and (n+1), where m is a natural number that satisfies m≠n.

5. Mobile information equipment comprising the image pickup device according to claim 4.

* * * * *